US010669903B2

(12) United States Patent
Oso et al.

(10) Patent No.: US 10,669,903 B2
(45) Date of Patent: Jun. 2, 2020

(54) OIL COOLING STRUCTURE OF ENGINE

(71) Applicant: KUBOTA Corporation, Osaka-shi, Osaka (JP)

(72) Inventors: Hiroki Oso, Sakai (JP); Hideyuki Koyama, Sakai (JP); Hideyuki Goto, Sakai (JP); Takahiro Yamazaki, Sakai (JP); Kentaro Nagai, Sakai (JP); Takashi Yamaguchi, Sakai (JP); Rina Kaneko, Sakai (JP)

(73) Assignee: KUBOTA Corporation, Osaka-Shi, Osaka (JP)

( * ) Notice: Subject to any disclaimer, the term of this patent is extended or adjusted under 35 U.S.C. 154(b) by 66 days.

(21) Appl. No.: 15/618,226

(22) Filed: Jun. 9, 2017

(65) Prior Publication Data
US 2018/0003093 A1 Jan. 4, 2018

(30) Foreign Application Priority Data

Jun. 30, 2016 (JP) .................... 2016-130715

(51) Int. Cl.
F01M 11/02 (2006.01)
F01M 5/00 (2006.01)
(Continued)

(52) U.S. Cl.
CPC .............. *F01M 5/002* (2013.01); *F01M 1/02* (2013.01); *F01M 5/005* (2013.01); *F01M 11/02* (2013.01);
(Continued)

(58) Field of Classification Search
CPC .......... F01M 5/002; F01M 1/02; F01M 5/005; F02F 7/007; F02B 67/04
See application file for complete search history.

(56) References Cited

U.S. PATENT DOCUMENTS 4,607,601 A   8/1986 Kohler
5,083,545 A   1/1992 Yamashita et al.
(Continued)

FOREIGN PATENT DOCUMENTS

EP   1031704 A2   8/2000
EP   3001007 A1   3/2016
(Continued)

OTHER PUBLICATIONS

Extended Search Report dated Nov. 27, 2017 in EP Application No. 17170434.9.
(Continued)

*Primary Examiner* — Kevin A Lathers
(74) *Attorney, Agent, or Firm* — Panitch Schwarze Belisario & Nadel LLP

(57) ABSTRACT

An oil cooling structure of an engine is provided that is capable of enhancing cooling performance of oil while preventing an increase in number of components or an increase in required space from being involved as much as possible. In an oil cooling structure of an engine in which a transmission case is attached to one end wall of an engine body, and a transmission mechanism for an accessory drive is provided in the transmission case, the transmission case is formed into a potlid-shaped body having a plurality of rib walls along a front-rear direction, and is attached to an engine front wall with an engine cooling fan, and case inner chamber portions partitioned by the rib walls in the transmission case are configured as a transporting passage of oil circulated by an oil pump.

13 Claims, 7 Drawing Sheets

(51) Int. Cl.
    *F02F 7/00*     (2006.01)
    *F16H 57/04*    (2010.01)
    *F02B 67/06*    (2006.01)
    *F01M 1/02*     (2006.01)
    *F02B 67/04*    (2006.01)

(52) U.S. Cl.
    CPC .............. *F02B 67/04* (2013.01); *F02B 67/06* (2013.01); *F02F 7/007* (2013.01); *F02F 7/0073* (2013.01); *F16H 57/0415* (2013.01); *F16H 57/0421* (2013.01); *F01M 2001/0253* (2013.01); *F02F 2007/0078* (2013.01)

(56) References Cited

U.S. PATENT DOCUMENTS

| | | |
|---|---|---|
| 7,029,346 B2 | 4/2006 | Yoshida et al. |
| 2009/0194062 A1 | 8/2009 | Iwata et al. |
| 2016/0090895 A1* | 3/2016 | Sakurai ............... F01P 1/06 123/41.1 |

FOREIGN PATENT DOCUMENTS

| | | |
|---|---|---|
| JP | S56-154584 U | 11/1981 |
| JP | H05033779 A | 2/1993 |
| JP | 08-200089 * | 8/1996 |
| JP | 3166532 B2 | 5/2001 |
| JP | 200397239 A | 4/2003 |
| JP | 2006063925 A | 3/2006 |
| JP | 2009138621 A | 6/2009 |
| JP | 2014148920 A | 8/2014 |
| JP | 2016070114 A | 5/2016 |

OTHER PUBLICATIONS

Office Action dated Apr. 2, 2019 in JP Application No. 2016-130715.
Examination Report dated Nov. 14, 2019 in EP Application No. EP 17170434.9.

* cited by examiner

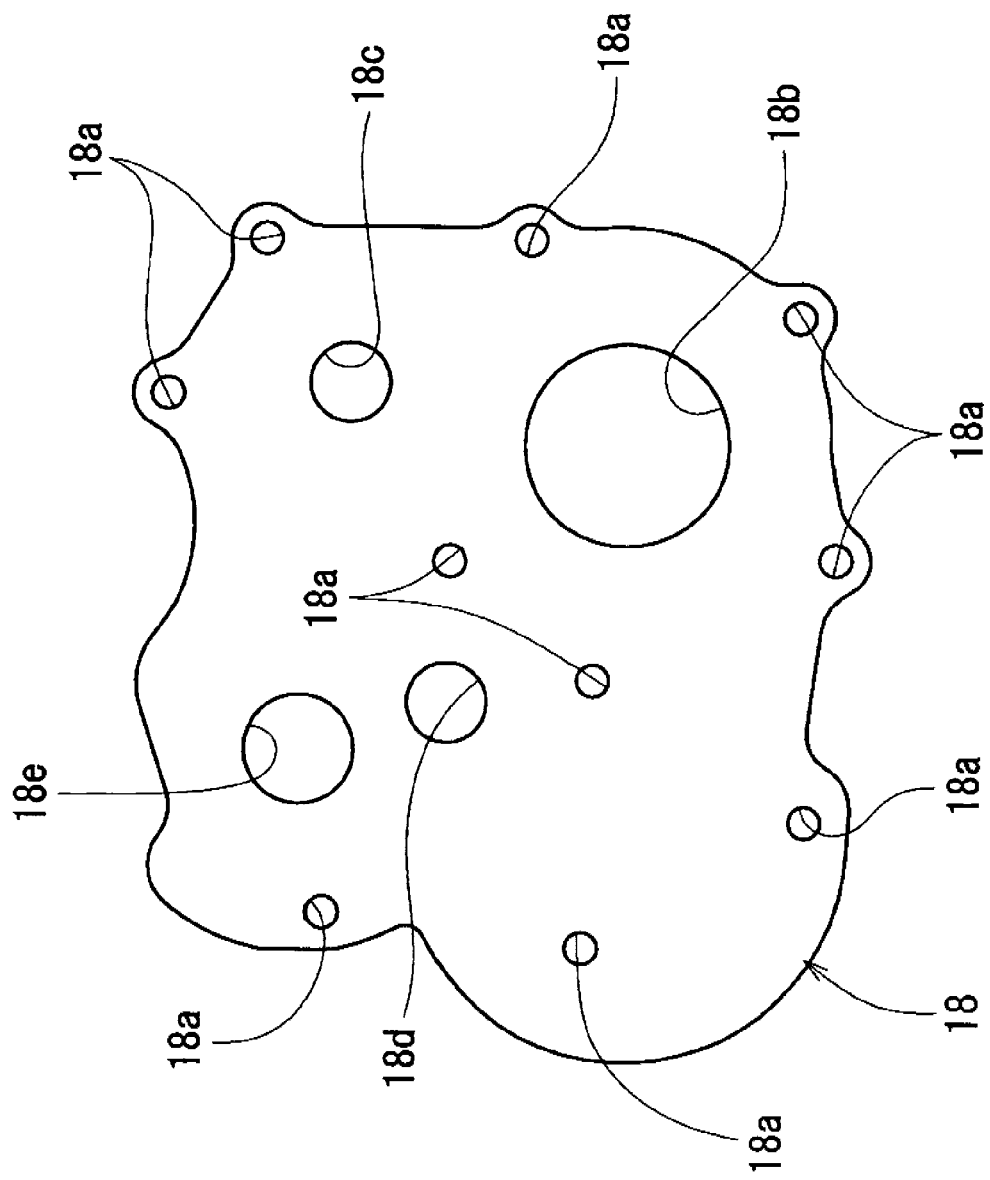

OIL COOLING STRUCTURE OF ENGINE

BACKGROUND OF THE INVENTION (1) Field of the Invention

The present invention relates to an oil cooling structure of an engine.

(2) Description of Related Art

Conventionally, a structure for cooling engine oil is provided with an oil cooler or has a large number of cooling fins formed in a pressure-feeding oil passage of a front case so as to allow cooling wind to act on the oil cooler and the cooling fins.

SUMMARY OF THE INVENTION

Conventionally, a disposition space for each of the oil cooler and the cooling fins is required, which increases dimensions, and the dedicated oil cooler, the air blower, or the like is to be newly provided, which increases a number of components. Thus, there has been room for improvement.

An object of the present invention is to provide an oil cooling structure of an engine that can enhance cooling performance while preventing an increase in number of components and an increase in required space from being involved as much as possible.

According to the present invention, in an oil cooling structure of an engine in which a transmission case is attached to one end wall of an engine body, and a transmission mechanism for accessory drive is provided in the transmission case, the transmission case is formed into a potlid-shaped structure body having a plurality of rib walls, and case inner chamber portions partitioned by the rib walls in the transmission case are configured as a transporting passage of oil circulated by an oil pump.

According to the present invention, it is possible to use dead spaces in the transmission case as a storage portion and a passage of the oil, so that the transmission case can function as a large capacity of a heat radiator of the oil.

Further, heat conduction of the oil can be efficiently performed to the transmission case, so that the transmission case exposed to outside is enabled to function as a heat radiator.

As a result, with further structural device, there is provided the oil cooling structure of the engine that can enhance the cooling performance of the oil while preventing an increase in number of components and an increase in required space from being involved as much as possible.

BRIEF DESCRIPTION OF THE DRAWINGS

FIG. 7 is a plan view of a pump cover alone.

DETAILED DESCRIPTION OF PREFERRED EMBODIMENTS

Hereinafter, taking as an example a case of a vertical water-cooled in-line diesel engine used for an agricultural machine or a construction machine, embodiments of an oil cooling structure of an engine according to the present invention will be described with reference to the drawings. As to the engine, a side where an engine cooling fan is mounted in a crankshaft direction is defined as front, an opposite side of the engine cooling fan is defined as rear, an alternator side is defined as right, and an opposite side of the alternator is defined as left.

Figure 1:
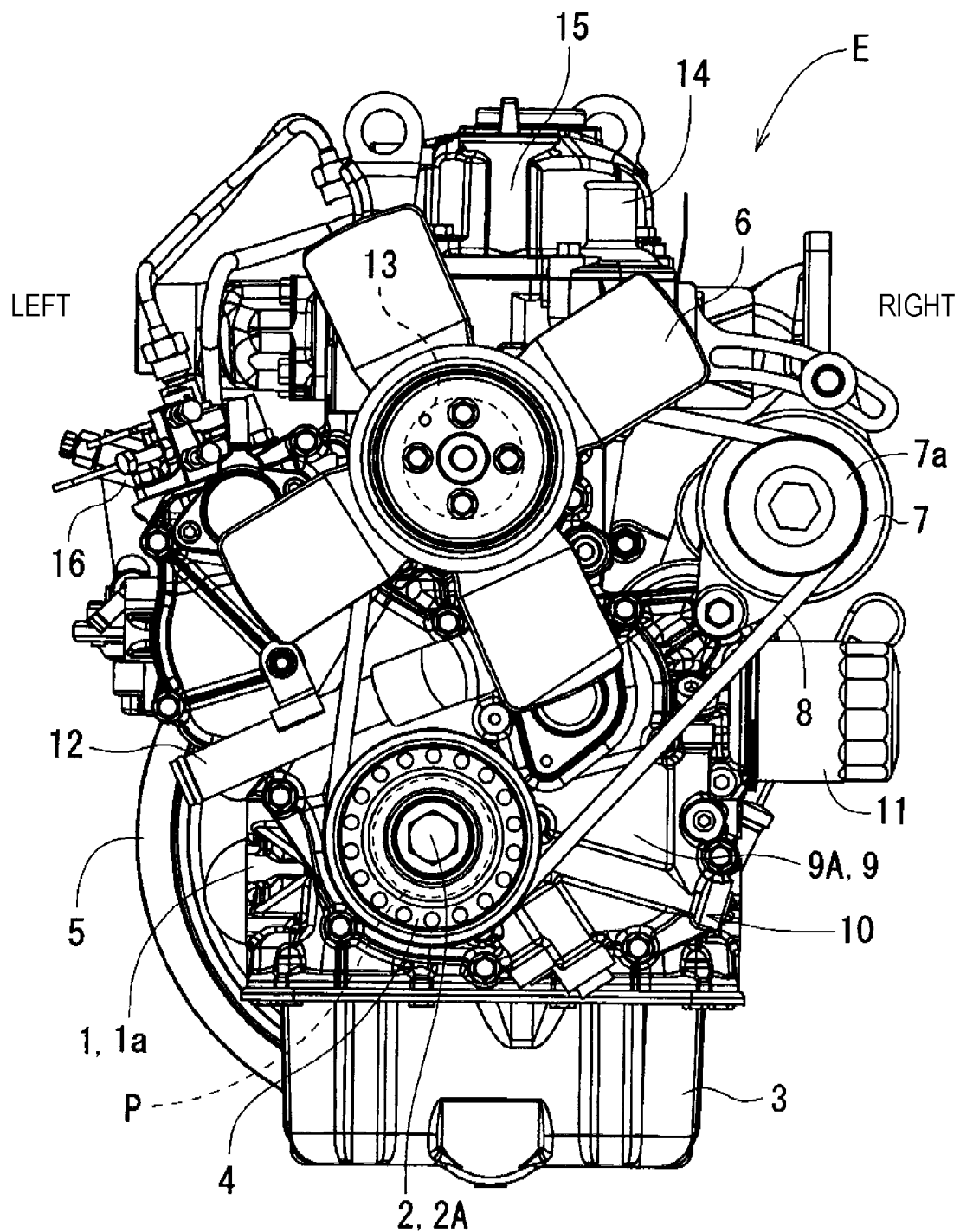
FIG. 1 is a front view of a diesel engine.
Figure 2:
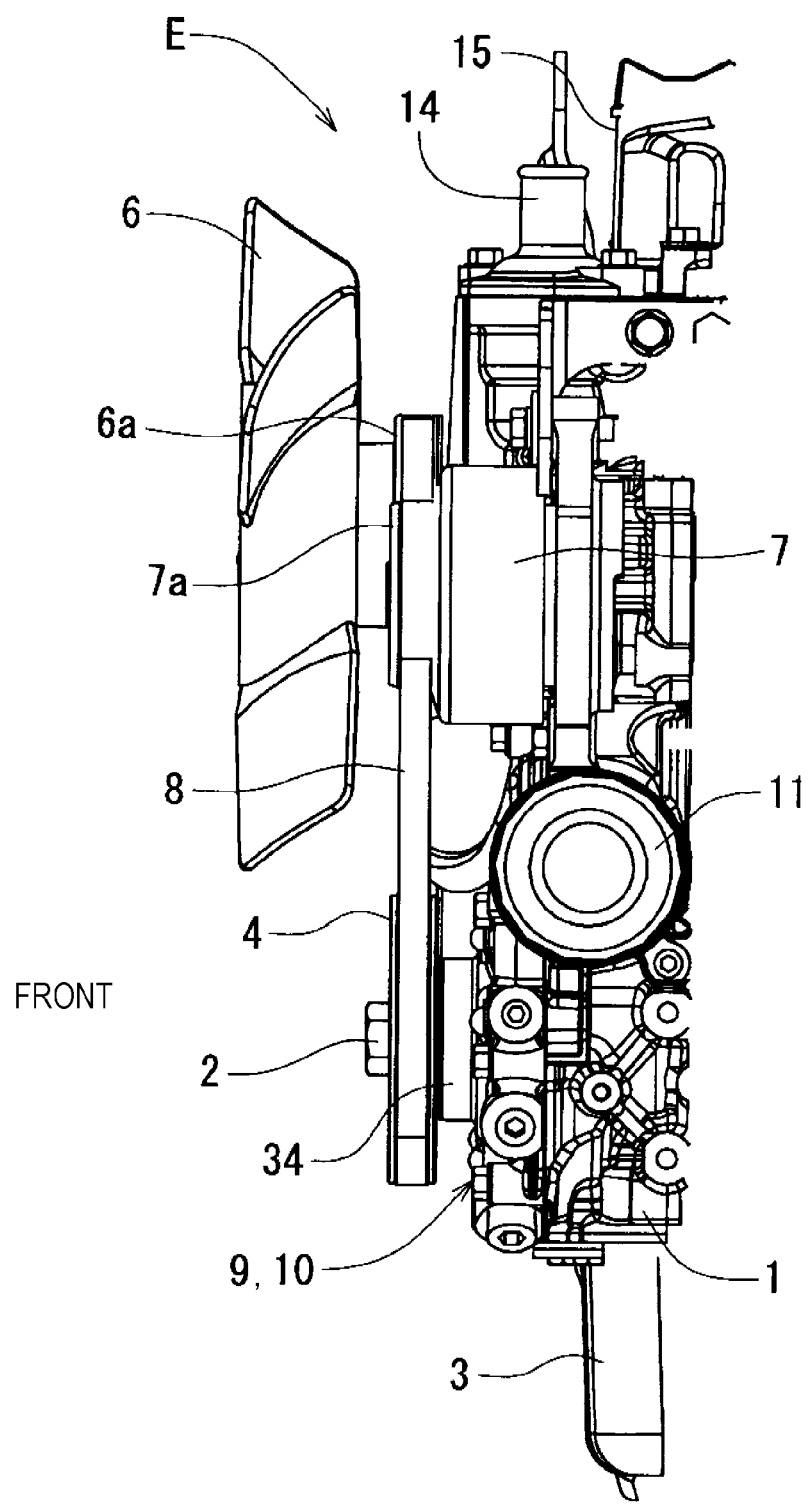
FIG. 2 is a right side view of a diesel engine front end portion in FIG. 1.

As shown in FIGS. 1 and 2, a vertical water-cooled in-line diesel engine E includes an engine body 1 including a crankshaft 2, an oil pan 3 assembled to a lower side of the engine body 1, an accessary drive pulley 4 mounted on the crankshaft 2, a flywheel 5 mounted on a rear end portion of the crankshaft 2, an engine cooling fan 6 provided in front of the engine body 1, an alternator 7, and the like. Although reference signs are omitted, one example of the engine body 1 is a cylinder block including a crank case portion and a cylinder portion above the crank case portion, and a cylinder head is assembled on the cylinder block.

A configuration is employed, in which an endless belt 8 is wound around the accessary drive pulley 4, a fan pulley 6a of the engine cooling fan 6, and an alternator pulley 7a of the alternator 7 to drive and rotate the engine cooling fan 6 and the alternator 7. The crankshaft 2 has a shaft front end portion (one example of a "transmission mechanism for accessary drive") 2A, which penetrates a front cover (a transmission case) 9 assembled to a front wall (one example of one end wall) 1a of the engine body 1 and projects forward, and the accessary drive pulley 4 is attached to the shaft front end portion 2A. A water pump 13 configured to circulate cooling water is transmissively coupled to the fan pulley 6a.

Here, in FIGS. 1, 2, reference sign 10 denotes a cooling device of the oil (the engine oil), P denotes an oil pump configured to pressure-feed the oil, 11 denotes an oil filter, 12 denotes a cooling water return pipe from a radiator (illustration is omitted), 14 denotes a cooling water pressure-feeding pipe to the radiator, 15 denotes a cylinder head cover assembled on the cylinder head, and 16 denotes a fuel injection pump.

Next, the oil cooling device 10 and the oil cooling structure will be described. As shown in FIGS. 1 to 4, the oil cooling device 10 is configured by the front cover 9 in which a large capacity of transporting passage W of the oil is internally formed. That is, in the oil cooling device 10, dissipation of a large amount of heat from a surface of the front cover 9, and an air cooling action by wind of the engine cooling fan 6 allow the oil flowing inside the front cover 9 to be efficiently cooled.

As shown in FIGS. 3 to 6, the front cover 9 is formed into a potlid-shaped structure body made of an aluminum alloy, having a main wall 9A facing right-left and up-down directions, and an outer circumferential rib wall 9B and an inner circumferential rib wall 9C both facing a front-back direction. Generally, the transmission case containing a transmission mechanism to drive various pumps and valve gears is made of metal such as an aluminum alloy, cast iron, wrought iron and the like, and is formed into a potlid shape, which is reinforced by a plurality of rib walls. Accordingly, the transmission case is a component in which relatively many dead spaces originally exist in portions other than places where the transmission mechanism and the like are disposed.

The outer circumferential rib wall 9B and the inner circumferential rib wall 9C are formed into flat surfaces to which the engine body 1 and a pump cover 18 (described later) are attached. A loop-shaped rib wall 9E to provide a return route of the oil is formed on a lower side of the outer circumferential rib wall 9B. Moreover, in the front cover 9, two coupling rib walls 9D configured to couple the outer circumferential rib wall 9B and the inner circumferential rib wall 9C in the same plane, a plurality of reinforcement ribs 9r and the like are formed. Further, in a portion that the shaft front end portion 2A passes, a pump chamber 17 to contain the trochoidal type oil pump P is formed into a recess.

The inner circumferential rib wall 9C includes a part of a chamber rib wall 9F to partition the pump chamber 17, and first and second partition rib walls 9G, 9H to form a discharge passage are formed in a state extending between the inner circumferential rib wall 9C and the chamber rib wall 9F. The first and second partition rib walls 9G, 9H, and the chamber rib wall 9F are formed as ribs in the same plane as the inner circumferential rib wall 9C. The pump cover 18 made of a steel plate having the same outline shape as that of the inner circumferential rib wall 9C is bolted to function as a lid that closes an inner section of the inner circumferential rib wall 9C.

Figure 3:
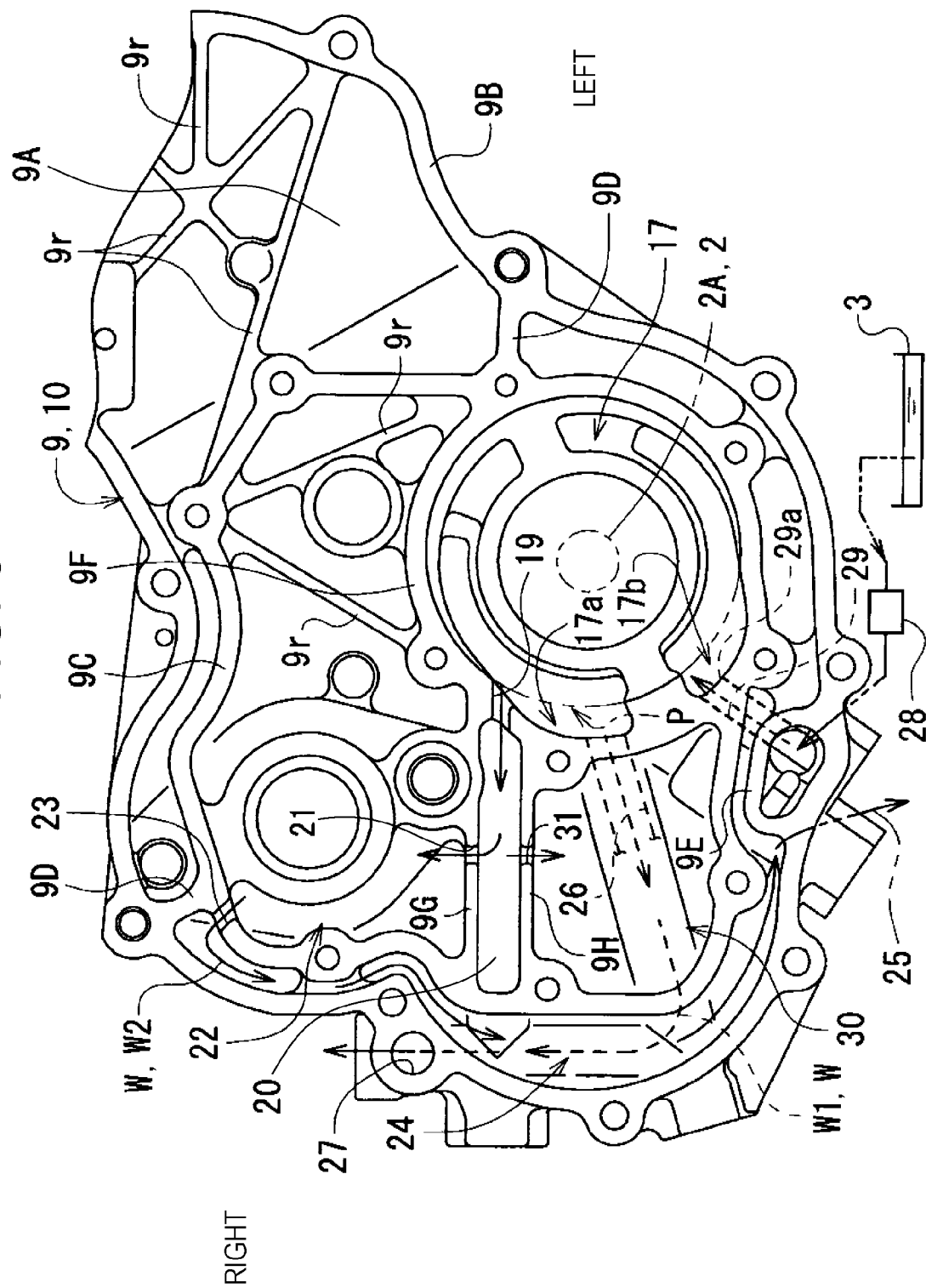
FIG. 3 is a rear view of a front cover alone.

As shown in FIG. 3, the oil discharged from the oil pump P exits from the front cover 9 through two transporting passages W1, W2. As indicated by broken arrow in FIG. 3, the first route W1 (W) is a route through which the oil passes a bent tunnel path 26 formed in the front cover 9 in a state open to a discharge-side section 17a of the pump chamber 17, and flows from a taking-out port 27 formed in the outer circumferential rib wall 9B to respective portions (an oil gallery and the like) of the engine body 1.

As shown in FIG. 3, the second route W2 (W) is a next route indicated by solid arrow. That is, the oil flows in order of a discharge cutout 19 formed in the chamber rib wall 9F→a first case inner chamber portion 20→a first cutout 21 of the first partition rib wall 9G→a second case inner chamber portion 22→a third cutout 23 formed in the inner circumferential rib wall 9C→a third case inner chamber portion 24→an oil receiving portion 25 of the engine body 1. Moreover, the oil in the oil pan 3 passes, from a strainer 28, a return tunnel path 29 (one example of the "transporting passage W") with a return port 29a, which is formed in the loop-shaped rib wall 9E, and flows to a suction-side section 17b of the pump chamber 17. To a right side of the return tunnel path 29, there is provided a projected portion for a pipeline in which a relief valve is assembled (reference sign is omitted).

The first case inner chamber portion 20 is an elongated space in a right-left direction, which is surrounded by the inner circumferential rib wall 9C, the first and second partition rib walls 9G, 9H, and the chamber rib wall 9F. The second case inner chamber portion 22 is a large capacity of space having a large area, which is surrounded by the inner circumferential rib wall 9C, the chamber rib wall 9F, and the first partition rib wall 9G. The third case inner chamber portion 24 is an elongated space formed between a right portion of the outer circumferential rib wall 9B and a right portion of the inner circumferential rib wall 9C. Moreover, a fourth case inner chamber portion 30 surrounded by the second partition rib wall 9H, the inner circumferential rib wall 9C, and the chamber rib wall 9F is formed, and is communicated with the first case inner chamber portion 20 by a second cutout 31 formed in the second partition rib wall 9H.

Figure 4:
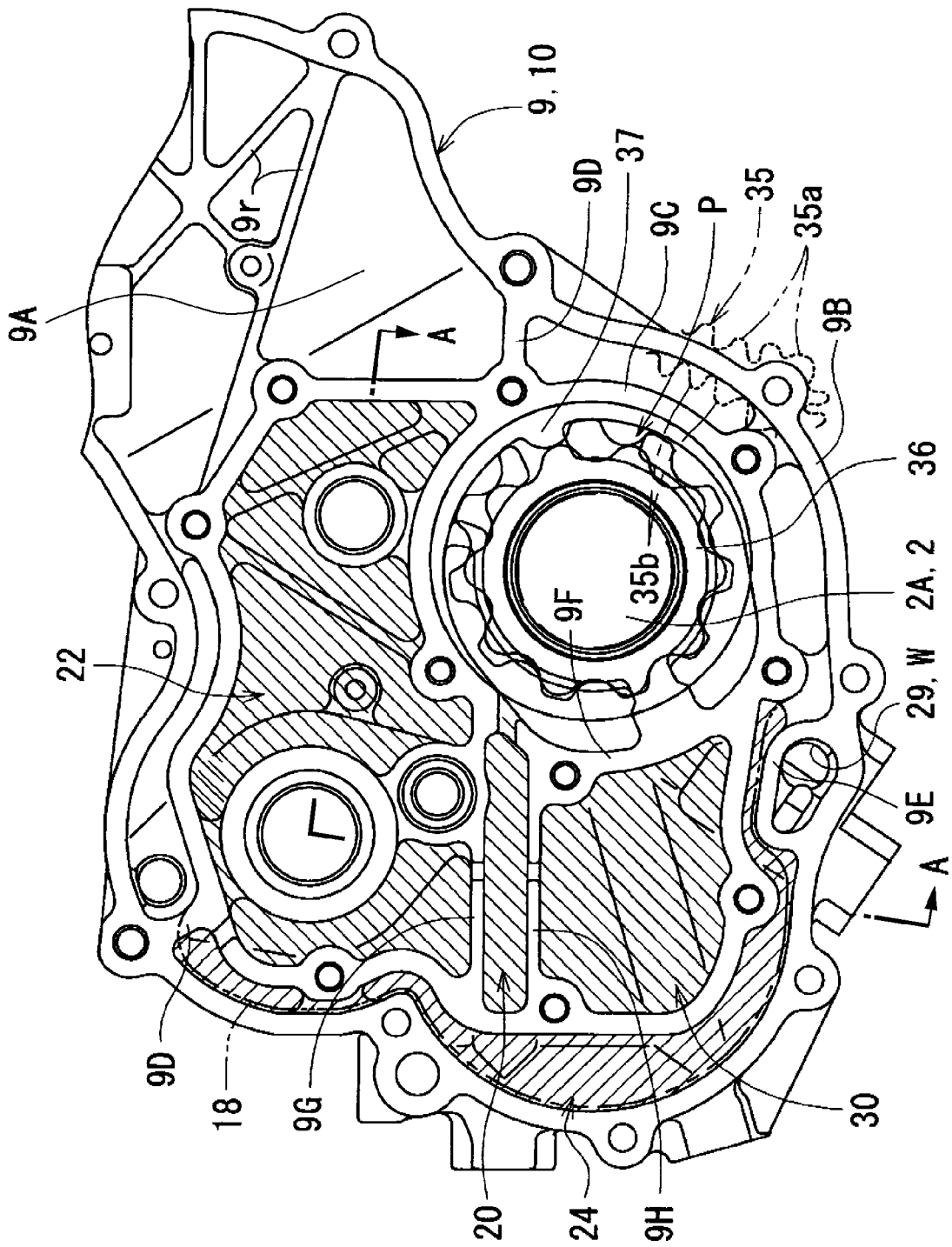
FIG. 4 is a rear view of the front cover in FIG. 3 showing case inner chamber portions.

As shown in FIGS. 3, 4, the oil pump P (refer to FIG. 1) is disposed in a space surrounded by the pump chamber 17 partitioned by the chamber rib wall 9F and formed into a recess in the front cover 9, and the pump cover 18 attached to a forefront surface of the chamber rib wall 9F. As one example, as shown in FIG. 4, the oil pump P is configured as a trochoidal type pump having an inner rotor 36 driven and rotated by the shaft front end portion 2A, and an outer rotor 37 engaged with the inner rotor 36. As to the oil pump P, only an outline thereof is shown in FIGS. 1, 3.

Figure 5:
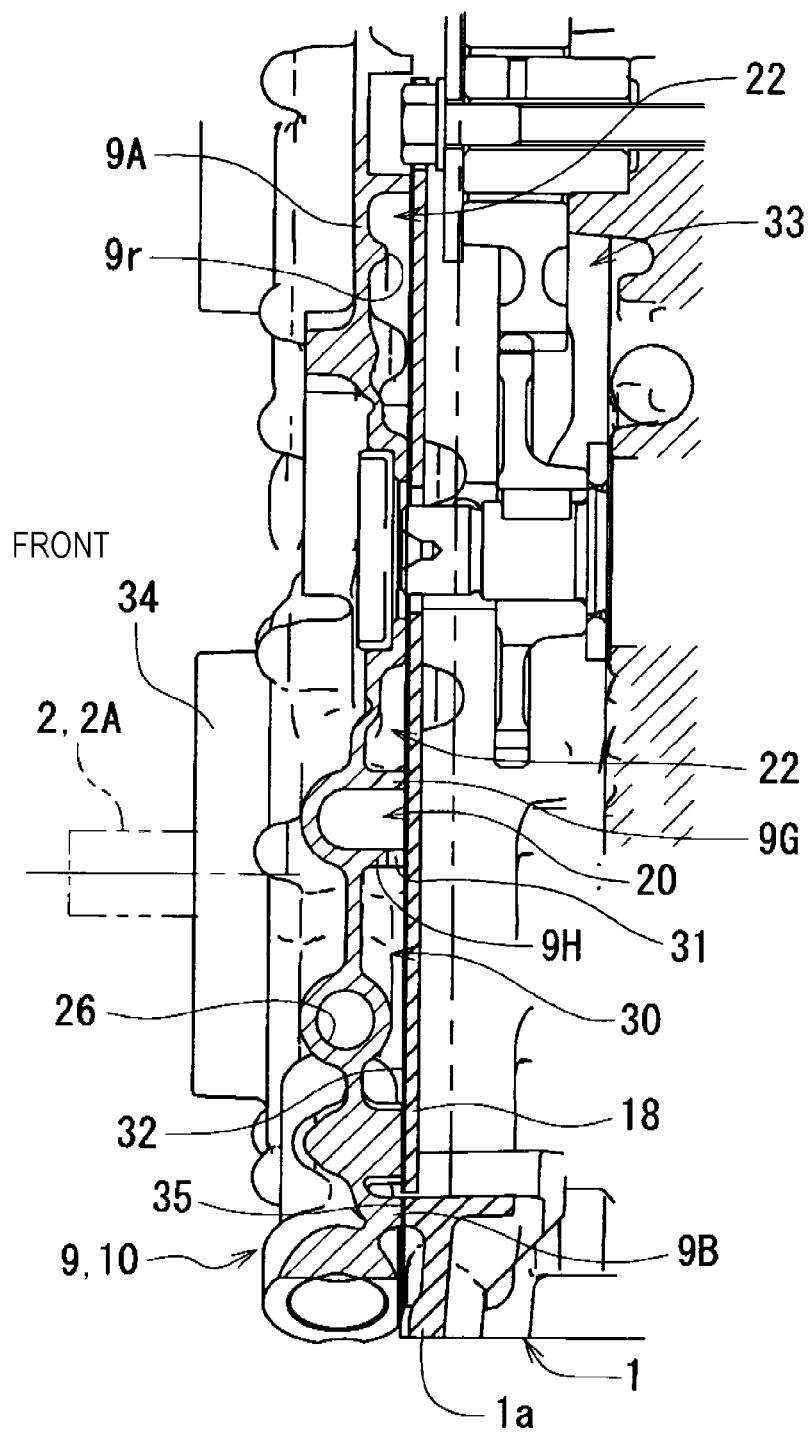
FIG. 5 is a schematic cross-sectional view of an engine front portion cut along A-A line in FIG. 4.
Figure 6:
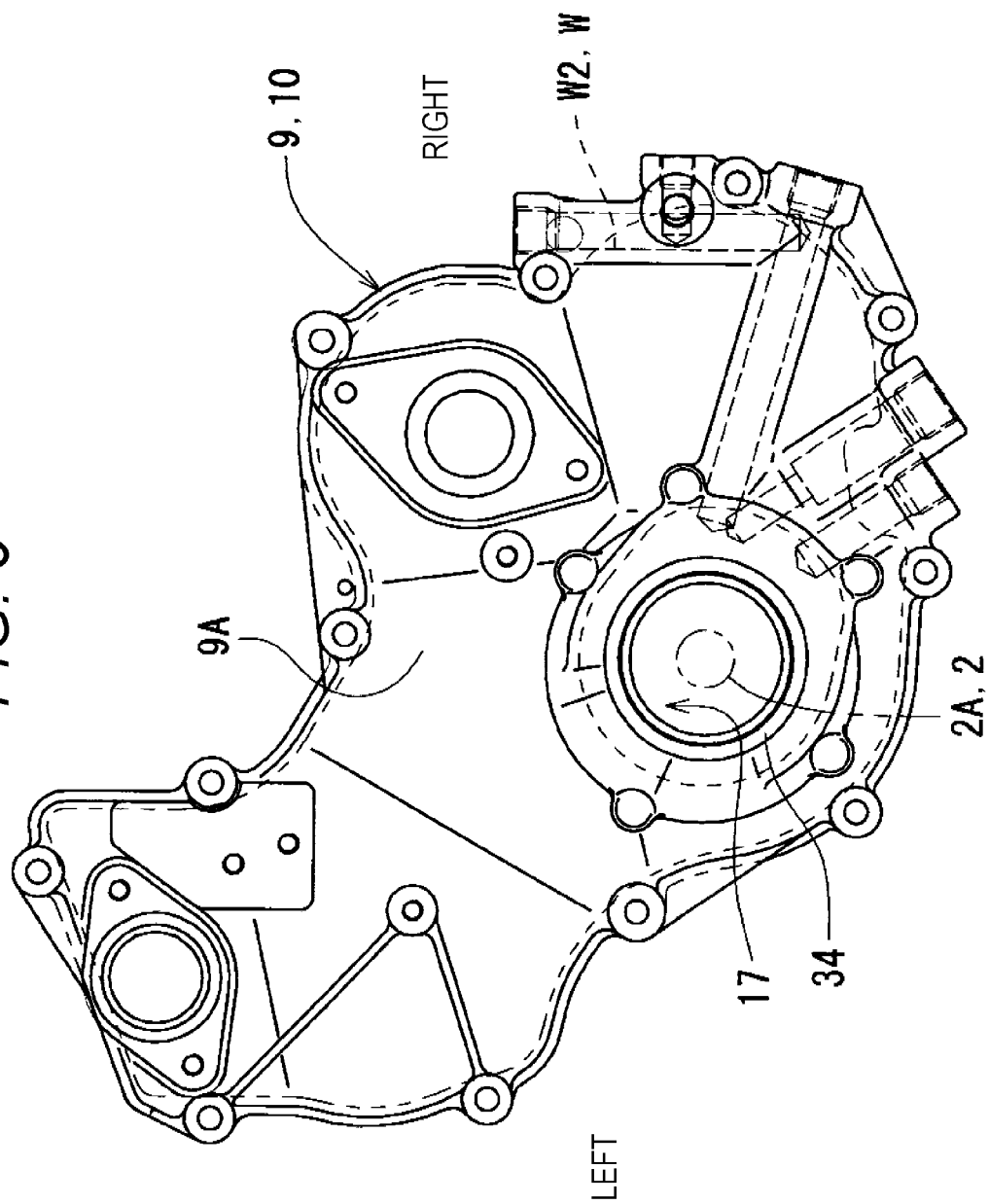
FIG. 6 is a front view of the front cover in FIG. 3.

As shown in FIGS. 4, 5, 7, the pump cover 18 is configured by a flat steel plate having a shape almost along an outline shape of the inner circumferential rib wall 9C, and is formed with a plurality of bolt insertion holes 18a, a large hole 18b that the shaft front end portion 2A passes through, a bolt head escape hole 18c, a cover protrusion escape hole 18d, and a shaft escape hole 18e. In a state where the pump cover 18 is attached to the inner circumferential rib wall 9C and the like with a plurality of bolts (illustration is omitted), the pump cover 18 functions not only as an inner frame body of the oil pump P but also a closing member as a lid that closes opening portions on the one end wall 1a side of the first case inner chamber portion 20, the second case inner chamber portion 22, and the fourth case inner chamber portion 30, which make up the transporting passage W2 (W).

A configuration is employed, in which of the plurality of rib walls 9B to 9H, respective forefront surfaces of the inner circumferential rib wall 9C, the first partition rib wall 9G, and the second partition rib wall 9H to form the first case inner chamber portion 20, the second case inner chamber portion 22, and the fourth case inner chamber portion 30 are in the same plane as the forefront surface of the chamber rib wall 9F. The pump cover 18 made of the single steel plate is bolted and mounted in close contact with the respective forefronts of the chamber rib wall 9F, the inner circumferential rib wall 9C, the first partition rib wall 9G, and the second partition rib wall 9H with a gasket 32 interposed.

As shown in FIG. 5, the front cover 9 is bolted to the engine body 1 so that the outer circumferential rib wall 9B is in a sealed state to the front wall 1a with a gasket 35 interposed. Accordingly, the third case inner chamber portion 24, which is not affected by a closing action by the pump cover 18, is a space (the transporting passage W2) surrounded by the outer circumferential rib wall 9B, the inner circumferential rib wall 9C, the coupling rib walls 9D, the loop-shaped rib wall 9E, and the engine body 1.

Reference sign 33 shown in FIG. 5 denotes a transmission mechanism for accessary drive in which a lower supply/exhaust cam gear and an upper idle gear are engaged (a gear transmission mechanism configured to drive the fuel injection pump, valve gears and the like), and the transmission mechanism is disposed in the front wall 1a, and is covered with the front cover 9. Moreover, reference sign 34 denotes a cylindrical shaft cover portion projected forward from the pump chamber 17 in the front cover 9.

As indicated by virtual line in FIG. 4, the gasket 35 interposed between the front wall 1a and the front cover 9 may include an outer cooling fin (one example of a fin) 35a protruded outward from an outline of the front cover 9, and/or an inner cooling fin (one example of the fin) 35b protruded inward from a forefront surface of the outer circumferential rib wall 9B. In addition, the gasket 35 with these fins 35a, 35b is made of copper excellent in thermal conductivity, which can favorably contribute to further enhancement in cooling performance of the oil.

Moreover, although illustration is omitted, a connection pipe for oil supply/exhaust attached to the front cover 9 or the like is favorably configured by a heat pipe with a heat sink excellent in a heat dissipation property.

The oil discharged from the oil pump P passes the first case inner chamber portion 20, the second case inner chamber portion 22, and the third case inner chamber portion 24, and also, the fourth case inner chamber portion 30 is filled with the discharged oil. Since the four case inner chamber portions 20, 22, 24, 30 are filled with the oil, the heat of the oil is conducted to the front cover 9 quickly and efficiently, so that the front cover 9 itself can function as a large capacity of heat radiator (oil cooler). The elongated and curved third case inner chamber portion 24, which is the transporting passage W2 of the oil, has a shape allowing the oil to enter an opposite side of the pump chamber 17.

While the fourth case inner chamber portion 30 only stores the oil, due to heat conduction from the stored oil, a favorable heat dissipation action of the front cover 9 can be expected. A configuration may be employed in which the second cutouts 31 communicating between the first case inner chamber portion 20 and the fourth case inner chamber portion 30 are provided at two or more positions apart from one another so that the oil can flow and pass through the fourth case inner chamber portion 30.

Accordingly, the inner spaces of the front cover 9 are effectively used as the storage and the transporting passage of the oil, by which the front cover 9 itself becomes a heat radiator, so that the cooling effect of the oil can be enhanced without increasing the number of components or providing a dedicated oil passage. In addition, cooling wind by the engine cooling fan 6 hits an outer surface of the front cover 9, and an air cooling action by this is added, which advantageously further increases the cooling effect of the oil.

«Other Embodiments»

For example, a configuration may be such that an oil pump P is installed in a place other than a front cover, such as a front wall 1a and the like, and a transporting passage of oil passes case inner chamber portions of the front cover.

An oil cooling structure of an engine according to the present invention has following features (1) through (6).

(1) The transmission case 9 is attached to a front wall 1a where an engine cooling fan 6 in the engine body 1 is disposed.

Accordingly, since the transmission case is attached to the front wall on which the engine cooling fan is mounted in the engine body, in the transmission case, not only natural heat dissipation (radiant heat) but also forced heat dissipation by an air cooling action by cooling wind is performed, which advantageously brings about a more favorable cooling effect of the oil.

(2) In the transmission case 9, the oil pump P driven by the transmission mechanism 2A is provided, and the case inner chamber portions 20, 22, 24, 30 are set as the transporting passage W of discharged oil or/and the transporting passage W of return oil with respect to the oil pump P.

Accordingly, since in the transmission case, not only the transporting passage of the discharged oil and the transporting passage of the return oil but also the oil pump itself is provided, the cooling action of the oil is strengthened, and as compared with a case where the oil pump is provided in a different place, a route that communicates the transporting passage of the transmission case and the oil pump need not be provided, which can advantageously reduce the number of components and costs.

(3) The oil pump P is disposed in a space surrounded by a pump chamber 17 and a pump cover 18, the pump chamber 17 being partitioned by a chamber rib wall 9F of the rib walls 9B to 9H and formed into a recess in the transmission case 9, and the pump cover 18 being attached to a forefront surface of the chamber rib wall 9F.

Accordingly, since the configuration is employed, in which the oil pump is disposed in the space surrounded by the pump chamber partitioned by the chamber rib wall and formed into a recess in the transmission case, and the pump cover attached to the forefront surface of the chamber rib wall, the pump can be favorably mounted with the two components.

(4) The pump cover 18 is also used as a closing member that closes the one end wall 1a side of the case inner chamber portions 20, 22, 24, 30 making up the transporting passage W.

Accordingly, the pump cover is also used as the closing member that closes the one end wall side of the case inner chamber portions making up the transporting passage, so that streamlining that the one component can exert the two functions can advantageously be performed.

(5) The rib walls 9B to 9H include an inner circumferential rib wall 9C, a first partition rib wall 9G, and a second partition rib wall 9H for forming the case inner chamber portions 20, 22, 24, 30, the inner circumferential rib wall 9C, the first partition rib wall 9G, and the second partition rib wall 9H having respective forefront surfaces which are in the same plane as a forefront surface of the chamber rib wall 9F, and the pump cover 18 made of a single flat plate material is mounted in a state abutting on respective forefronts of the chamber rib wall 9F, the inner circumferential rib wall 9C, the first partition rib wall 9G, and the second partition rib wall 9H.

Accordingly, the respective forefront surfaces of the inner circumferential rib wall, the first partition rib wall, and the second partition rib wall for forming the case inner chamber portions, and the forefront surface of the chamber rib wall are in the same plane, which advantageously brings about an effect that the pump cover having the two functions can be simply and inexpensively configured by the single flat plate material.

(6) The one end wall 1a and the transmission case 9 are assembled with a gasket 35 interposed, and the gasket 35 is set to have a shape with a fin 35a protruded outward from an outline of the transmission case 9.

Accordingly, since the gasket interposed between the one end wall and the transmission case is provided with the fin protruded outward from the transmission case, the heat is dissipated outside from the fin, so that the cooling action is promoted by the gasket with the fin, which brings about an advantage that the cooling effect of the oil flowing in the transmission case is strengthened.

What is claimed is:

1. An oil cooling structure of an engine in which a transmission case is attached to one end wall of an engine body, and a transmission mechanism for an accessory drive is provided in the transmission case, wherein the transmission case comprises a cover having a plurality of rib walls, and case inner chamber portions partitioned by the rib walls in the transmission case are configured as a transporting passage of oil circulated by an oil pump,
wherein the case inner chamber portions are directly open to a discharge-side section of the oil pump accommodated in the transmission case.

2. The oil cooling structure of the engine according to claim 1, wherein the transmission case is attached to a front wall where an engine cooling fan in the engine body is disposed.

3. The oil cooling structure of the engine according to claim 2, wherein in the transmission case, the oil pump driven by the transmission mechanism is provided, and the case inner chamber portions are set as the transporting passage of discharged oil with respect to the oil pump.

4. The oil cooling structure of the engine according to claim 3, wherein the oil pump is disposed in a space surrounded by a pump chamber and a pump cover, the pump chamber being partitioned by a chamber rib wall and formed into a recess in the transmission case, and the pump cover being attached to a forefront surface of the chamber rib wall.

5. The oil cooling structure of the engine according to claim 4, wherein the pump cover is also used as a closing member that closes the one end wall side of the case inner chamber portions making up the transporting passage.

6. The oil cooling structure of the engine according to claim 5, wherein
the rib walls include an inner circumferential rib wall, a first partition rib wall, and a second partition rib wall for forming the case inner chamber portions, the inner circumferential rib wall, the first partition rib wall, and the second partition rib wall having respective forefront surfaces which are in the same plane as a forefront surface of the chamber rib wall, and
the pump cover made of a single flat plate material is mounted in a state abutting on respective forefronts of the chamber rib wall, the inner circumferential rib wall, the first partition rib wall, and the second partition rib wall.

7. The oil cooling structure of the engine according to claim 4, wherein
the rib walls include an inner circumferential rib wall, a first partition rib wall, and a second partition rib wall for forming the case inner chamber portions, the inner circumferential rib wall, the first partition rib wall, and the second partition rib wall having respective forefront surfaces which are in the same plane as a forefront surface of the chamber rib wall, and
the pump cover made of a single flat plate material is mounted in a state abutting on respective forefronts of the chamber rib wall, the inner circumferential rib wall, the first partition rib wall, and the second partition rib wall.

8. The oil cooling structure of the engine according to claim 1, wherein in the transmission case, the oil pump driven by the transmission mechanism is provided, and the case inner chamber portions are set as the transporting passage of discharged oil with respect to the oil pump.

9. The oil cooling structure of the engine according to claim 8, wherein the oil pump is disposed in a space surrounded by a pump chamber and a pump cover, the pump chamber being partitioned by a chamber rib wall and formed into a recess in the transmission case, and the pump cover being attached to a forefront surface of the chamber rib wall.

10. The oil cooling structure of the engine according to claim 9, wherein the pump cover is also used as a closing member that closes the one end wall side of the case inner chamber portions making up the transporting passage.

11. The oil cooling structure of the engine according to claim 10, wherein
the rib walls include an inner circumferential rib wall, a first partition rib wall, and a second partition rib wall for forming the case inner chamber portions, the inner circumferential rib wall, the first partition rib wall, and the second partition rib wall having respective forefront surfaces which are in the same plane as a forefront surface of the chamber rib wall, and
the pump cover made of a single flat plate material is mounted in a state abutting on respective forefronts of the chamber rib wall, the inner circumferential rib wall, the first partition rib wall, and the second partition rib wall.

12. The oil cooling structure of the engine according to claim 9, wherein
the rib walls include an inner circumferential rib wall, a first partition rib wall, and a second partition rib wall for forming the case inner chamber portions, the inner circumferential rib wall, the first partition rib wall, and the second partition rib wall having respective forefront surfaces which are in the same plane as a forefront surface of the chamber rib wall, and
the pump cover made of a single flat plate material is mounted in a state abutting on respective forefronts of the chamber rib wall, the inner circumferential rib wall, the first partition rib wall, and the second partition rib wall.

13. The oil cooling structure of the engine according to claim 1, wherein the one end wall and the transmission case are assembled with a gasket interposed, and the gasket is set to have a shape with a fin protruded outward from an outline of the transmission case.

* * * * *